US006285506B1

(12) United States Patent
Chen

(10) Patent No.: US 6,285,506 B1
(45) Date of Patent: Sep. 4, 2001

(54) CURVED OPTICAL DEVICE AND METHOD OF FABRICATION

(75) Inventor: Zewu Chen, Ballston Lake, NY (US)

(73) Assignee: X-Ray Optical Systems, Inc., Albany, NY (US)

( * ) Notice: Subject to any disclaimer, the term of this patent is extended or adjusted under 35 U.S.C. 154(b) by 0 days.

(21) Appl. No.: 09/342,606

(22) Filed: Jun. 29, 1999

Related U.S. Application Data

(60) Provisional application No. 60/116,557, filed on Jan. 21, 1999.

(51) Int. Cl.[7] .............................. G02B 3/00; G02B 13/18; G21K 1/06

(52) U.S. Cl. .......................... 359/642; 359/708; 359/711; 359/712; 378/84

(58) Field of Search ............................ 359/708, 709–712, 359/642; 378/84

(56) References Cited

U.S. PATENT DOCUMENTS

| | | | |
|---|---|---|---|
| 4,599,741 | 7/1986 | Wittry | 378/85 |
| 4,679,918 * | 7/1987 | Ace | 351/177 |
| 4,780,899 | 10/1988 | Adema et al. | 378/84 |
| 4,949,367 | 8/1990 | Huizing et al. | 378/84 |
| 5,799,056 | 8/1998 | Gutman | 378/84 |
| 5,843,235 | 12/1998 | Bergman et al. | 118/720 |

FOREIGN PATENT DOCUMENTS

| | | |
|---|---|---|
| 0200261 | 4/1989 | (EP) . |
| 0339713 | 11/1989 | (EP) . |
| 02160517 | 6/1990 | (JP) . |

OTHER PUBLICATIONS

Z.W. Chen and D.B. Wittry, "Microprobe x–ray fluorescence with the use of point–focusing diffractors", Appl. Phys. Lett. 71 (13), Sep. 29, 1997, 1997 American Institute of Physics, pp. 1884–1886.

Z.W. Chen and D.B. Wittry, "Microanalysis by monochromatoc microprobe x–ray fluorescence–physical basis, properties, and future prospects", Journal of Applied Physics, vol. 84, No. 2, Jul. 15, 1998, 1998 American Institute of Physics, pp. 1064–1073.

* cited by examiner

*Primary Examiner*—Scott J. Sugarman
(74) *Attorney, Agent, or Firm*—Heslin Rothenberg Farley & Mesiti P.C.; Kevin P. Radigan, Esq.

(57) ABSTRACT

An optically curved device and method of fabrication are presented wherein a flexible layer is bonded to a thick epoxy layer which functions to conform the flexible layer to a desired shape. The thick epoxy layer undergoes high viscosity flow under pressure and conforms the flexible layer to a curved surface of a mold. The pressure on the epoxy can be created by squeezing the epoxy using a backing plate. As long as the optically smooth surface of the flexible layer has good contact with the curved surface of the mold under pressure of the epoxy flow, irregularities in the flexible layer optical surface are eliminated and the shape of the flexible layer is maintained when the epoxy is cured and the mold removed. Materials other than epoxies, such as thermal plastics can also be used for bonding and conforming the flexible layer.

37 Claims, 5 Drawing Sheets

CURVED OPTICAL DEVICE AND METHOD OF FABRICATION

This application claims the benefit of U.S. Provisional Application No. 60/116,557 filed Jan. 21, 1999. The provisional application is hereby incorporated by reference herein in its entirety.

TECHNICAL FIELD

The present invention relates to novel methods of producing curved optical elements, in particular elements of extremely high precision, for use with soft and hard x-rays, ultraviolet, visible, and infrared radiation and the optical elements achieved by these methods.

BACKGROUND OF THE INVENTION

Curved surfaces are used in a number of applications including but not limited to doubly curved crystals for x-ray applications, mirrors for ring laser gyros, and substrates for single or multilayer thin films.

Doubly curved crystals are known to be useful as a focusing device for monochromatic x-ray or a wavelength dispersive device in an x-ray spectrometer. For example, a toroidal curved crystal can provide point-to-point focusing of monochromatic x-rays, and a crystal curved to an ellipsoid can be used as a broad energy x-ray detection device. Some of the prior art is described in U.S. Pat. No. 4,780,899 and U.S. Pat. No. 4,949,367. These devices, having crystals bonded on a smooth concave substrate by a very thin layer of adhesive, have the drawback that the smoothness of the crystal planes is strongly affected by irregularities of the bonding layer. The irregularities can result from the lack of initial uniformity of the bonding layer on the substrate, or can occur during mounting of the crystal even if the initial adhesive layer is highly uniform. Another drawback is that a carefully prepared substrate is required for each curved surface.

Thus, the present invention is directed to providing inexpensive high quality optical surfaces, and to methods of fabrication thereof.

SUMMARY OF THE INVENTION

Briefly summarized, the present invention comprises in one aspect an optically curved element which includes a backing plate having a supporting surface, and an adhesive layer disposed above the supporting surface of the backing plate. The adhesive layer has a minimum thickness x. A flexible layer is also provided and disposed above the adhesive layer. The flexible layer, which includes an optical surface having a desired curvature, has a thickness y, wherein $x>y$.

In another aspect, an optically curved element is provided which includes a flexible layer and an adhesive layer. The flexible layer, which has an optical surface of a desired curvature, has a thickness y. The adhesive layer, which is disposed on a main surface of the flexible layer other than the optical surface, has a minimum thickness x, wherein $x>y$.

In a further aspect, a method for fabricating an optically curved element using a mold having a curved surface is provided. The method includes: providing a flexible layer having an optical surface; providing a backing plate having a supporting surface and disposing the flexible layer between the supporting surface of the backing plate and the curved surface of the mold; applying an adhesive between the flexible layer and the supporting surface of the backing plate; and applying pressure to at least one of the backing plate and the mold to squeeze the adhesive and conform the flexible layer to the curved surface of the mold, thereby producing the optically curved element.

In a still further aspect, a method for fabricating an optically curved element is disclosed which includes: providing a backing plate having a supporting surface; providing an adhesive layer disposed above the supporting surface of the backing plate, the adhesive layer having a minimum thickness x; and providing a flexible layer disposed above the adhesive layer, the flexible layer comprising an optical surface, and conforming the optical surface of the flexible layer to a desired curvature, the flexible layer having a thickness y, wherein $x>y$.

In one specific embodiment of the present invention, the device is fabricated by providing an optically smooth flexible layer, securing the flexible layer to a surface of a mold having a desired optical doubly curved shape, providing an adhesive (wherein the method of securing the optical surface of the flexible layer to the mold prevents adhesive from contacting the surface of the mold), providing a backing plate on the adhesive and applying pressure to at least one of the backing plate and the mold to squeeze the adhesive and permanently conform the surface of the flexible layer to the surface of the mold, and thereafter, removing the mold to thereby produce the device.

To restate, provided herein is a novel curved optical element, and method of fabrication, that acquires its shape from a reusable mold. Advantageously, the optical surface of the flexible layer need not conform exactly to a supporting surface of a backing plate. Further, the backing plate can be removable from the rest of the optical element. Thus, an inexpensive optically curved surface can be fabricated in accordance with the principles of the present invention, i.e., because a reusable mold is employed, and since the backing plate curvature and surface finish are not critical. The use of a relatively thick epoxy layer allows the flexible layer to conform to a curved surface of the mold. As used herein, relatively thick means that the thickness of the adhesive layer is greater than the thickness of the flexible layer having the optical surface to be curved.

In accordance with the present invention, the smooth optical surface can be curved to any preselected geometry to comprise one of a convex surface, a concave surface, a toroidal surface, a parabolic surface, a spherical surface or an ellipsoidal surface. The optical surface can be a singularly curved surface or a doubly curved surface. When the flexible layer comprises a crystal having diffracting planes, the diffracting planes can be either inclined or parallel to the optical surface of the flexible layer.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
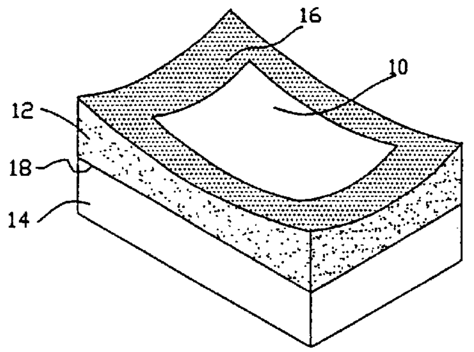
FIG. 1 shows a simple form of the invention: a flexible layer comprising an optically smooth surface, a thick epoxy layer and a flat backing plate.

A curved optical device as shown in FIG. 1 comprises a flexible layer 10, a thick epoxy layer 12 and a backing plate 14. The structure of the device is shown by the vertical cross-sectional view in FIG. 2. In this device, the epoxy layer 12 holds and constrains the flexible layer 10 to a selected geometry having a curvature. Preferably, the thickness of the epoxy layer is greater than 20 μm and the thickness of the flexible layer is greater than 5 μm. Further, the thickness of the epoxy layer is typically thicker than the thickness of the flexible layer. The flexible layer can be one of a large variety of materials, including: mica, Si, Ge, quartz, plastic, glass etc. The epoxy layer 12 can be a paste type with viscosity in the order of $10^3$ to $10^4$ poise and 30 to 60 minutes pot life. The backing plate 14 can be a solid object that bonds well with the epoxy. The surface 18 of the backing plate can be flat (FIG. 2) or curved as shown in FIG. 3, and its exact shape and surface finish are not critical to the shape and surface finish of the flexible layer. This is contrasted with standard fabrication practices which require a backing plate with a surface that is exactly the desired shape of the device. Another drawback to the standard approach is that each device requires a specially prepared backing plate. In the invention disclosed here, a specially prepared backing plate is not required.

Figure 2:
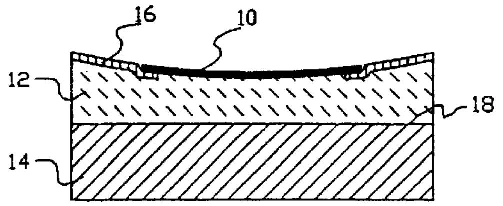
FIG. 2 shows a vertical section view of FIG. 1.
Figure 3:
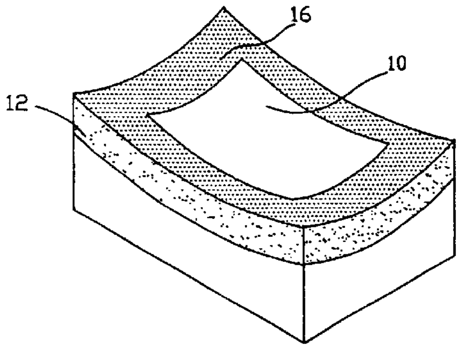
FIG. 3 shows a similar device with a flexible layer comprising an optically smooth surface, a thick epoxy layer and a concave backing plate.

The surrounding of the flexible layer may be a thin sheet of protection material 16, such as a thin plastic, that is used around the flexible layer edge (see FIG. 2). The protection material protects the mold so that the mold is reusable. The protection material would not be necessary for a mold that is the exact size or smaller than the flexible layer or for a sacrificial mold.

Figure 4A:
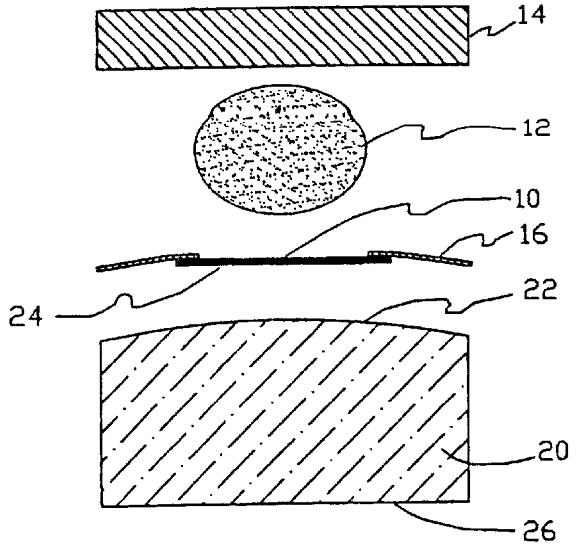
FIG. 4*a* shows a vertical cross-sectional view of an initial arrangement for fabrication of the device.
Figure 4B:
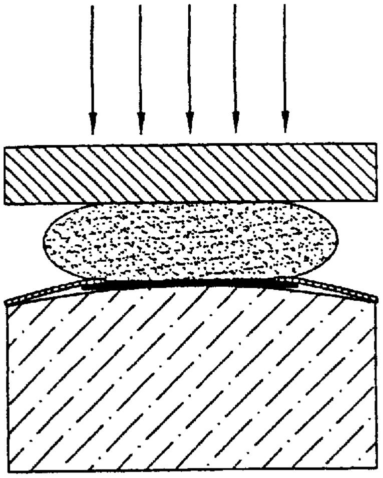
FIG. 4*b* shows the configuration of a fabrication stage with the flexible layer being partially conformed.
Figure 4C:
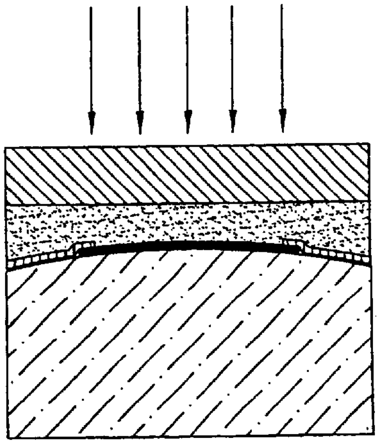
FIG. 4*c* shows the final stage of the fabrication with the optically smooth surface of the flexible layer conformed to the exact shape of the mold.

The fabrication method of the curved optical device is schematically illustrated in FIGS. 4*a*, 4*b* and 4*c*. In this method, the optically smooth flexible layer 10 is prepared and it may be a sheet with a smooth optical surface or a crystal sheet with diffracting planes parallel to the surface (see FIG. 5*a*) or with diffracting planes inclined to the surface (see FIG. 5*b*). Then thin sheet plastic protection material 16 (such as tape) may be attached around the flexible layer edges as shown in FIG. 4*a*, then the flexible layer with the thin plastic protection material 16 is positioned on a convex mold 20 which has an optically smooth surface 22 curved to a preselected geometry. The epoxy 12 is prepared and applied between the flexible layer and the backing plate. The thin plastic protection material 16 prevents the epoxy from contacting the mold surface 22 and bonding to the mold surface allowing the mold to be reused. A solid backing plate 14 is placed over the epoxy and a pressure is applied on the plate to squeeze the epoxy to conform the optically smooth surface of the flexible layer to the shape of surface 22. A preferred method is to gradually increase the pressure as the viscosity of the epoxy increases during the polymerization stage. During processing, the epoxy is at room temperature and pressure is applied mechanically in the span of about an hour. Curing time for the epoxy is approximately 24 hours, and the epoxy comprises a low shrinkage material, approximately 0.001"/inch.

The thick epoxy layer undergoes high viscosity flow under pressure to conform the flexible layer on a convex mold curved to a pre-selected geometry. The epoxy layer is applied between the flexible layer and a backing plate. The pressure on the epoxy can be created by squeezing the epoxy using the backing plate. As long as the flexible layer has good contact with the convex mold under pressure of the epoxy flow, irregularities on the flexible layer can be eliminated and the shape of the flexible layer can be maintained when the epoxy is cured. The epoxy in a preferred embodiment has properties of low shrinkage, high viscosity, and high dimensional stability after setting. Alternatively, materials other than epoxies that meet these criteria can also be used for bonding and conforming the flexible layer.

The mold of a preferred embodiment is made of glass or other light transparent materials so that the contact between the optically smooth surface of the flexible layer 24 and the convex surface 22 can be viewed from bottom surface 26. The unevenness of the optical surface of the flexible layer with respect to the convex surface 22 can be revealed by optical interference fringes under illumination of light through surface 26. When the epoxy is cured, the flexible layer with the epoxy and the backing plate are removed from the mold and the final device is made. The mold may be diamond turned to achieve a high quality mold surface. The shape of the flexible layer is determined by the shape of the mold surface. The flexible layer is permanently conformed to the curvature of the mold. The mold may be reused to make additional optically curved devices.

The backing plate is carefully aligned to the mold during the fabrication process that allows for easy alignment of the optic. The edges of the backing plate or other registration points on the backing plate are used to find the center of the optic and/or the optic orientation for a curved optical element.

Figure 5A:
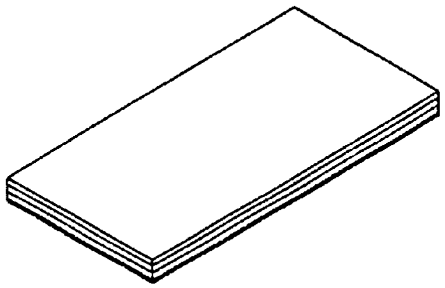
FIG. 5*a* is a flat crystal sheet with flat diffracting atomic planes parallel to the crystal surface.
Figure 5B:
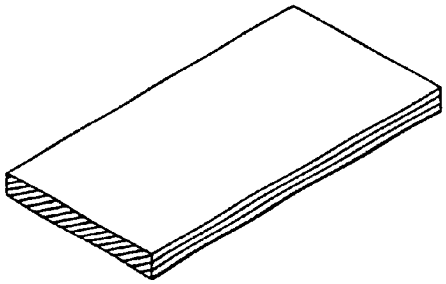
FIG. 5*b* is a flat crystal sheet with flat diffracting planes inclined to the crystal surface.
Figure 6A:
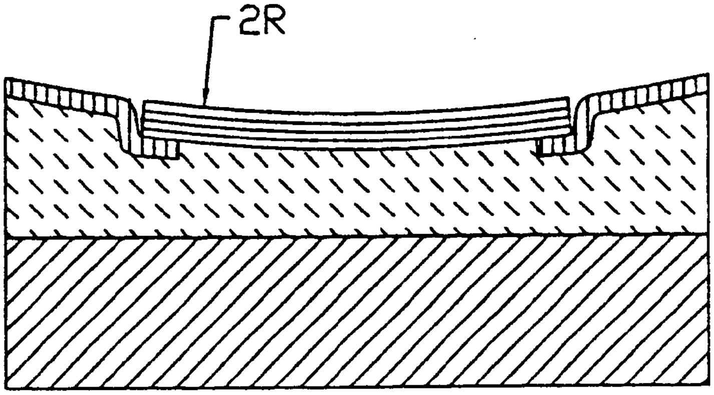
FIG. 6*a* is a vertical cross-section view of a crystal device using the type of crystal slab in FIG. 5*a;*
Figure 6B:
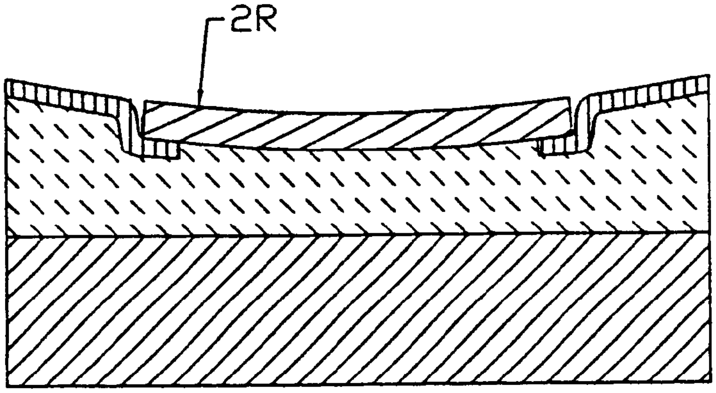
FIG. 6*b* is a vertical cross-section view of a crystal device using the type of crystal slab in FIG. 5*b*.

FIGS. 6*a* & 6*b* show the final configurations of devices corresponding to two types of the crystal slabs described in FIGS. 5*a* & 5*b*, respectively. The crystal device has Johann geometry in the plane of Roland circle if the crystal slab used for fabrication is one of the types shown in FIGS. 5*a* & 5*b* and the curvature of the mold in the corresponding plane is 2R, where R is the radius of the Roland circle. The diffracting planes of the crystal can be parallel (FIG. 6*a*) or inclined (FIG. 6*b*) to the surface of the crystal. A device having the diffraction plane inclined to the crystal surface has the property that the source and the image are asymmetrical in the Roland circle plane with respect to the crystal.

In this method, the flexible layer's final curvature is determined by the curvature of the curved surface of the mold 22 and not directly by the shape of the backing plate. Therefore the curvature and the surface finish of the backing plate are not critical to the curvature and surface finish of the flexible layer. The curved surface of the mold 22 can be convex or concave and toroidal, spherical, ellipsoid, or other optical surfaces, and hence the flexible layer can be curved to any of these geometries.

Figure 7:
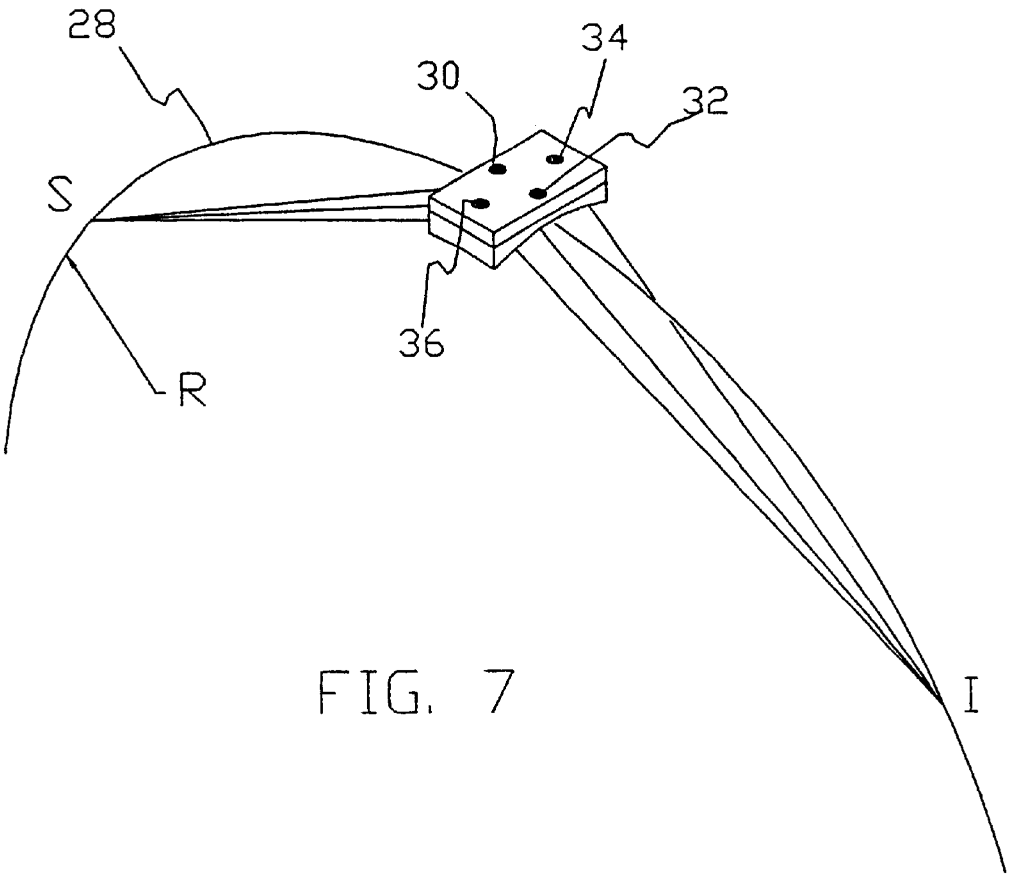
FIG. 7 shows a toroidal crystal device with point-to-point focusing property.

One significant application of this invention where a crystal is used as the flexible layer is focusing a particular wavelength of x-rays from a small x-ray source. This type of device with point-to-point focusing property is illustrated in FIG. 7. The crystal in this device has a toroidal shape and the crystal satisfies Johann geometry in plane of Rowland circle 28 and also has axial symmetry about the line joining source S and image I.

An x-ray crystal device in accordance with the invention offers a highly uniform doubly bent crystal because of the elimination of the effects of irregularity occurring in a thin bonding layer in the prior art, and it gives better performance when used for x-ray optics applications.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed:

1. An optically curved element comprising:

a backing plate having a supporting surface;

an adhesive layer disposed above said supporting surface of said backing plate, said adhesive layer having a minimum thickness x; and an optical layer disposed above said adhesive layer, said optical layer comprising an optical surface, said optical surface of said optical layer having a desired curvature, and said optical layer having a thickness y, wherein x>y.

2. The optically curved element of claim 1, wherein said supporting surface of said backing plate has a curvature, said curvature of said supporting surface being different than said curvature of said optical surface of said optical layer.

3. The optically curved element of claim 1, wherein said optical surface of the optical layer is smoother than said supporting surface of said backing plate.

4. The optically curved element of claim 1, wherein said supporting surface of said backing plate comprises a planar surface.

5. The optically curved element of claim 1, wherein said optical layer with said optical surface comprises one of mica, silicon, germanium, quartz, glass, plastic or a crystalline material.

6. The optically curved element of claim 1, wherein said optical surface of said optical layer comprises an optically smooth surface.

7. The optically curved element of claim 1, wherein said optical surface comprises at least one of a convex surface, concave surface, toroidal surface, parabolic surface, spherical surface or an ellipsoidal surface.

8. The optically curved element of claim 1, wherein said optical surface comprises one of a singularly curved surface or a doubly curved surface.

9. The optically curved element of claim 1, wherein said optical layer comprises a crystal having diffracting planes, said diffracting planes being either inclined or parallel to said optical surface of said optical layer.

10. The optically curved element of claim 1, wherein said adhesive comprises an epoxy material, and wherein said optically curved element further comprises a protective layer surrounding an edge of said optical layer such that said adhesive is disposed between said optical layer, with said protective layer surrounding said edge thereof, and said supporting surface of said backing plate.

11. The optically curved element of claim 1, wherein said minimum thickness x of said adhesive layer is greater than or equal to 20 μm.

12. The optically curved element of claim 1, wherein said thickness y of said flexible layer is greater than or equal to 5 μm.

13. The optically curved element of claim 1, wherein said optical layer comprises a crystal, said adhesive layer is an epoxy, and wherein: $0.1\ \text{mm} \leqq x \leqq 1\ \text{mm}$ and $10\ \mu\text{m} \leqq y \leqq 50\ \mu\text{m}$.

14. The optically curved element of claim 13, wherein said backing plate comprises a cylindrical shape.

15. The optically curved element of claim 1, wherein said optical surface comprises an x-ray optical surface, and said optically curved element comprises a curved x-ray optical element.

16. The optically curved element of claim 1, wherein said optical layer has a uniform thickness, said uniform thickness comprising said thickness y.

17. An optically curved element comprising:

an optical layer comprising an optical surface, said optical surface of said optical layer having a desired curvature, and said optical layer having a thickness y; and an adhesive layer disposed on a main surface of said flexible layer other than said optical surface, said adhesive layer having a minimum thickness x, wherein x>y.

18. The optically curved element of claim 17, wherein said optical layer having said optical surface comprises one of mica, silicon, germanium, quartz, glass, plastic or a crystalline material.

19. The optically curved element of claim 17, wherein said optical surface of said optical layer comprises an optically smooth surface.

20. The optically curved element of claim 17, wherein said optical surface comprises at least one of a convex surface, concave surface, toroidal surface, spherical surface or an ellipsoidal surface.

21. The optically curved element of claim 17, wherein said optical surface comprises one of a singularly curved surface or a doubly curved surface.

22. The optically curved element of claim 17, wherein said optical layer comprises a crystal having diffracting planes, said diffracting planes being either inclined or parallel to said optical surface of said flexible layer.

23. The optically curved element of claim 17, wherein said optical surface comprises an x-ray optical surface, and said optically curved element comprises a curved x-ray optical element.

24. The optically curved element of claim 17, wherein said optical layer has a uniform thickness, said uniform thickness comprising said thickness y.

25. A method for fabricating an optically curved element using a mold having a curved surface, said method comprising:

providing a flexible layer having an optical surface;

providing a backing plate having a support surface and disposing said flexible layer between said supporting surface of said backing plate and said curved surface of said mold;

applying an adhesive between said flexible layer and said supporting surface of said backing plate; and applying pressure to at least one of said backing plate and said mold to squeeze said adhesive and conform said flexible layer to said curved surface of said mold, thereby producing said optically curved element.

26. The method of claim 25, wherein said optical surface of said flexible layer comprises one of a planar surface or a curved surface prior to said applying of said pressure.

27. The method of claim 25, wherein said adhesive comprises an epoxy, and wherein said method further comprises curing said epoxy while under pressure.

28. The method of claim 27, further comprising increasing said pressure applied as viscosity of said epoxy increases during curing.

29. The method of claim 25, wherein said mold having said curved surface is fabricated of a transparent material such that compression of said optical surface of said flexible layer is viewable through said mold.

30. The method of claim 25, further comprising removing said mold from contact with said optical surface of said flexible layer and subsequently reusing said mold in a fabrication process for a separate optically curved element.

31. The method of claim 25, further comprising providing said mold with said curved surface, wherein said curved surface is ground, diamond turned or polished to a precise, desired shape.

32. The method of claim 25, wherein said flexible layer has a surface area smaller than a surface area of said curved surface of said mold, and wherein said method further comprises providing a protective material adjacent at least one edge of said flexible layer prior to disposing said adhesive between said flexible layer and said supporting surface of said backing plate, wherein said protective material is sized and configured to prevent adhesive from contacting said curved surface of said mold.

33. The method of claim 32, wherein said protective material comprises a flexible sheet material, said flexible sheet material comprising a tape.

34. The method of claim 25, wherein said disposing of said adhesive comprises at least one of applying said adhesive to said flexible layer or applying said adhesive to said supporting surface of said backing plate.

35. The method of claim 25, further comprising removing said mold from contact with said optical surface of said flexible layer, and after curving said adhesive, removing said backing plate from contact with said adhesive, and subsequently reusing said backing plate in a fabrication process for a separate optically curved element.

36. A method for fabricating an optically curved element which can defract radiation of a desired wavelength, said method comprising:

providing a backing plate having a supporting surface;

providing an adhesive layer disposed above said supporting surface of said backing plate, said adhesive layer having a minimum thickness x; and providing an optical layer disposed above said adhesive layer, said optical layer comprising an optical surface, and conforming said optical surface of said optical layer to a desired curvature, said optical layer having a thickness y, wherein x>y.

37. The method of claim 36, further comprising removing said backing plate from contact with said adhesive layer after providing said optical layer above said adhesive layer conforming said optical surface of said optical layer to said desired curvature.

* * * * *